July 24, 1962   K. R. SCHNEIDER   3,046,010
STACKER APPARATUS
Filed Feb. 4, 1960   5 Sheets-Sheet 1

INVENTOR.
KURT R. SCHNEIDER
BY
Mason, Porter, Diller & Stewart,
ATTORNEYS

INVENTOR.
KURT R. SCHNEIDER
BY
Mason, Porter, Diller & Stewart
ATTORNEYS

July 24, 1962 K. R. SCHNEIDER 3,046,010
STACKER APPARATUS
Filed Feb. 4, 1960 5 Sheets—Sheet 3
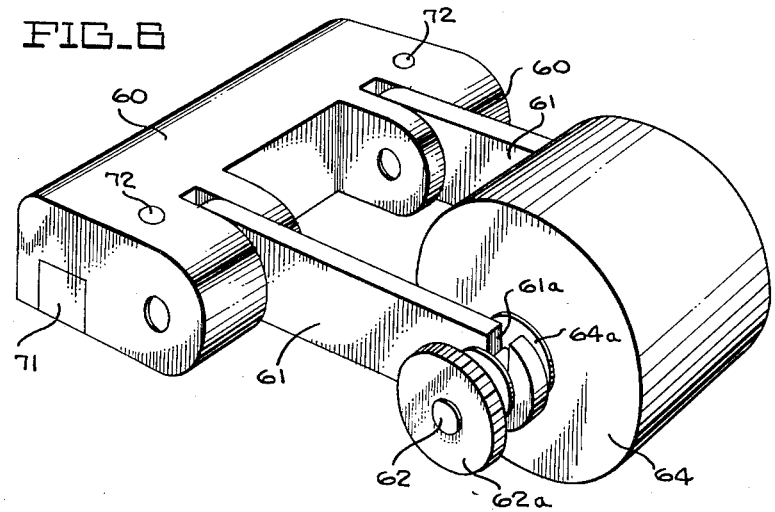
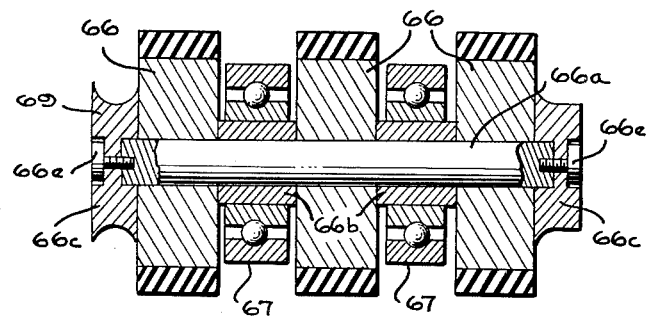
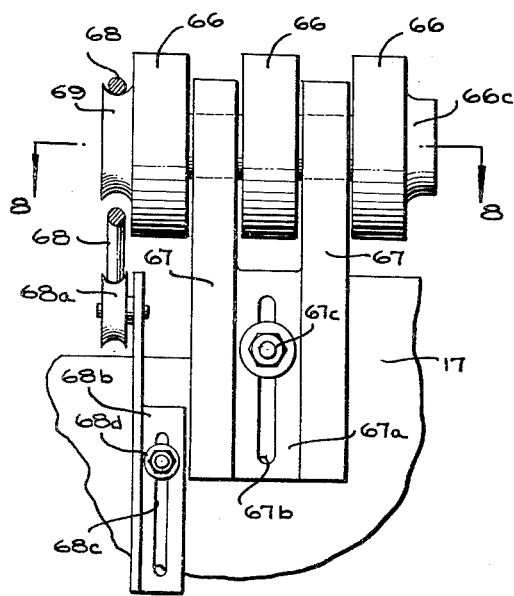
INVENTOR
KURT R. SCHNEIDER
BY Mason, Porter, Diller & Stewart,
ATTORNEYS July 24, 1962 K. R. SCHNEIDER 3,046,010
STACKER APPARATUS
Filed Feb. 4, 1960 5 Sheets—Sheet 4
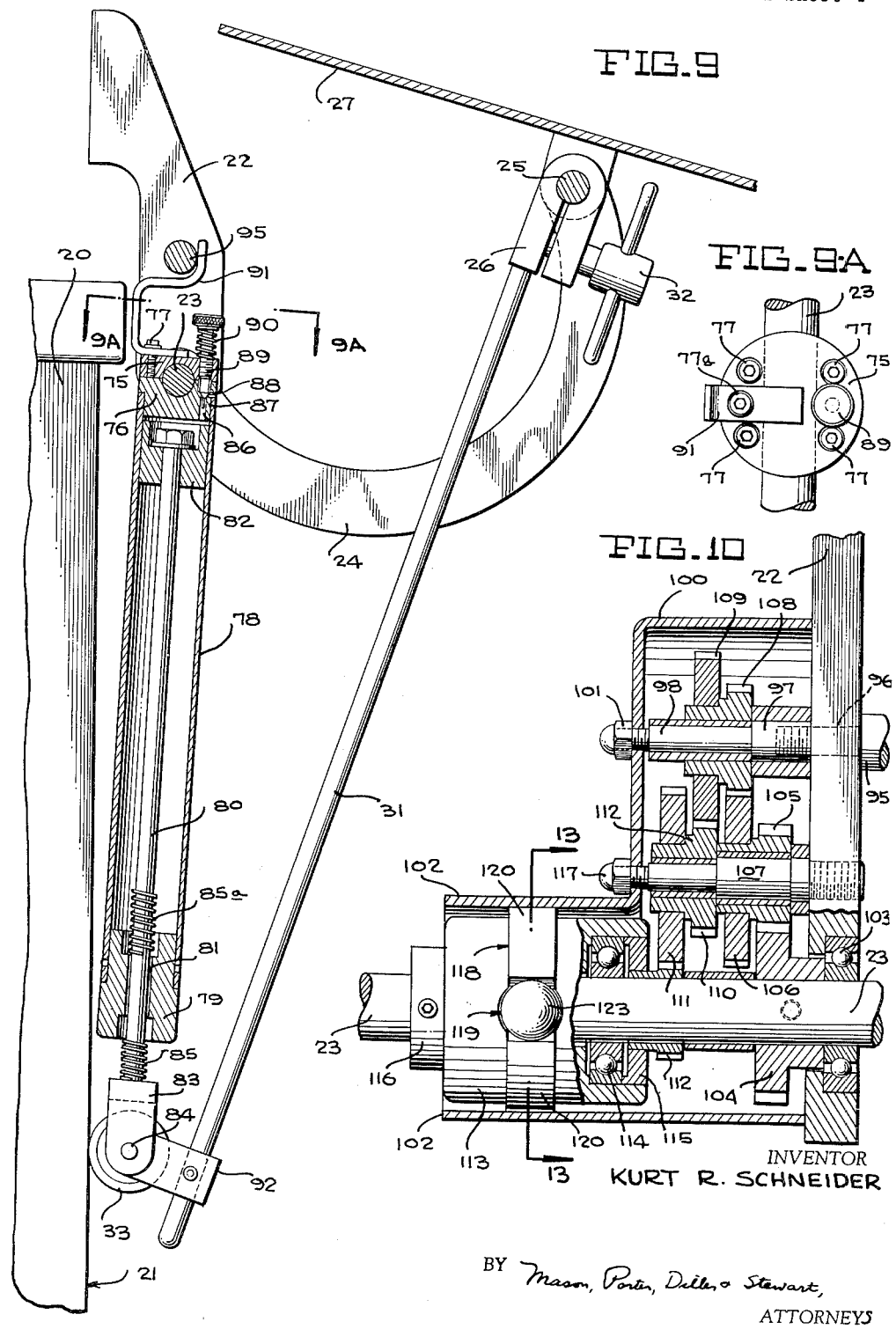
INVENTOR
KURT R. SCHNEIDER
BY Mason, Porter, Diller & Stewart,
ATTORNEYS

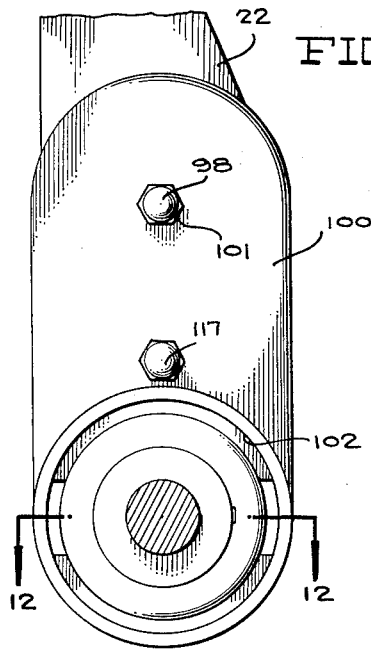
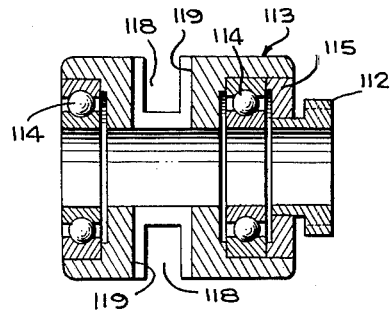
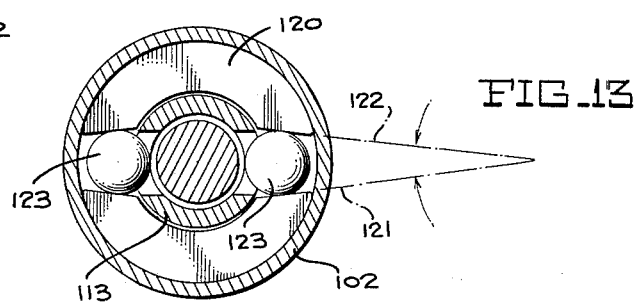
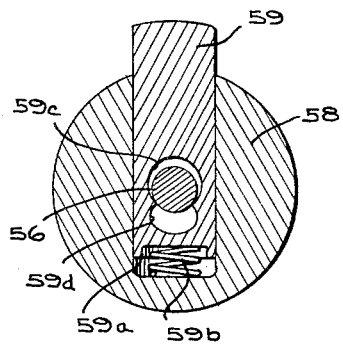
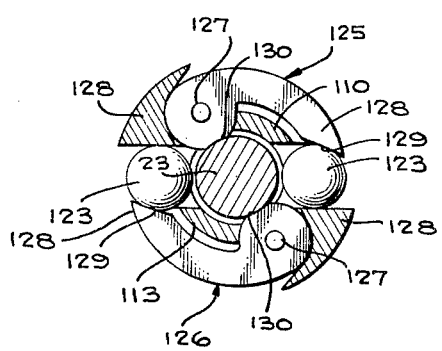
INVENTOR.
KURT R. SCHNEIDER
BY
Mason, Porter, Diller & Stewart,
ATTORNEYS

United States Patent Office 3,046,010
Patented July 24, 1962

3,046,010
STACKER APPARATUS
Kurt Rudolf Schneider, Bainbridge, N.Y., assignor to Eureka Specialty Printing Co., Scranton, Pa., a corporation of Pennsylvania
Filed Feb. 4, 1960, Ser. No. 6,819
28 Claims. (Cl. 271—88)

This invention relates to an apparatus for receiving, in orderly form, a succession of articles and arranging them in a pile or stack.

The apparatus is particularly adapted to form a part of a system in which flat articles such as envelopes, postal cards, and packages are being treated, as by addressing, and then are to be collected in piles or stacks ready for tying or wrapping in bundles, with the articles successively being delivered from the treatment step at a constant level and wherein the successive articles are collected into a pile or stack which descends as the height of articles therein increases.

An object of the invention is the provision of an apparatus having a stack receiver and counterbalancing means whereby the receiver descends at a rate and for a distance determined by the collection of the successive articles thereon.

Another object is the provision of an apparatus having a stack receiver, a rocking support for the receiver and pivotally connected thereto, counterbalancing means connected to the support, and a device for controlling the position of the receiver during its descent.

A further object is the provision of an apparatus having a counterbalanced support, a stack receiver on the support, with a device for controlling its angular position during upward and downward movement, and means to restrict excessive movement and rate of movement upwardly or downwardly.

A further object is the provision of an apparatus having a stack receiver, a support for the receiver whereby it can descend by the effect of the increasing stack thereon, a device for controlling the position of the receiver during its descent, and means for delivering successive articles above the receiver for collection in the stack.

With these and other objects in view, as will appear in the course of the following specification and claims, an illustrative embodiment of the invention is shown on the accompanying drawings, in which:

FIGURE 6 is a perspective view of a top roller and support;

FIGURE 7 is an elevation of a roller and pulley mounting;

FIGURE 8 is a cross-section, substantially on line 8—8 of FIGURE 7;

FIGURE 9 is a view of a part of FIGURE 3, on a larger scale, detailing a dampening device;

FIGURE 9A is a view substantially on the line 9A—9A of FIGURE 9;

FIGURE 10 is a view, at enlarged scale, substantially on line 10—10 of FIGURE 1, showing parts of a dampening device;

FIGURE 11 is an end elevation of parts in FIGURE 10;

FIGURE 12 is a section through a part in FIGURE 10, substantially on line 12—12 of FIGURE 11;

FIGURE 13 is a sectional view, substantially on line 13—13 of FIGURE 10;

FIGURE 14 is a view corresponding to FIGURE 13, of a modified form;

FIGURE 15 is a section, on a larger scale, substantially on line 15—15 of FIGURE 1.

Figure 1:
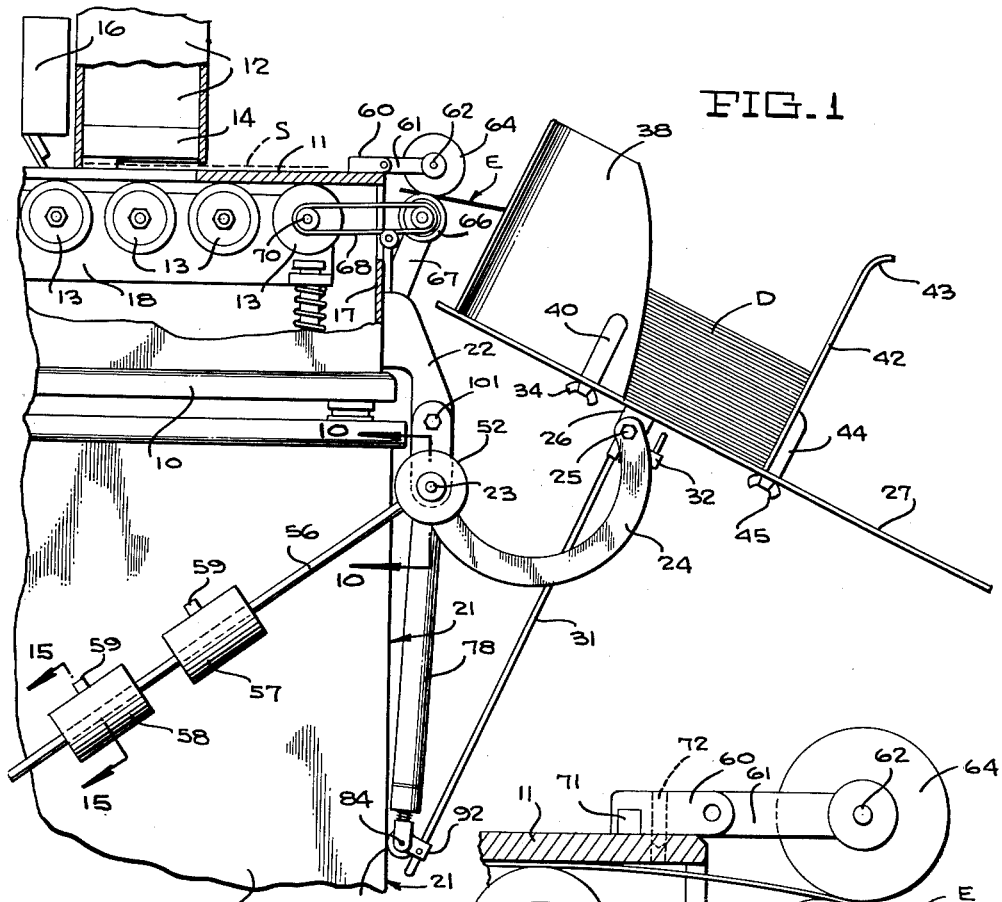
FIGURE 1 is a view partly in side elevation, with associated elements partly in section, of an apparatus according to this invention.

In the drawing, the stacker is shown as integrated with a label applying machine such as that set out in my Patent 2,754,022. In such a machine, a stack of envelopes or like articles and a sheet or strip of labels are provided. During operation of the machine, shown as having a base 10, a top plate 11 and a punch housing 12, the articles such as the envelope E are advanced from left to right in FIGURE 1 beneath the top plate 11 by the action of axially spaced pairs of driven rollers 13; a label sheet S above the top plate 11, FIGURE 2, is fed in the direction of the arrow so that an end label comes beneath a punch 14 in the punch housing 12, and this punch is operated in timed relation so that the end label is severed and delivered through an aperture in the top plate 11 onto the envelope. A wetting device 16 is also operated in timed relation, when remoistening glue is on the lower surface of the label, to wet a defined area on the envelope to which the label is to be applied. After application of the label, the envelope is fed forward beneath the top plate 11 by the rollers 13 and thence out through an aperture in the end plate 17 of the base 10. The driven rollers are mounted on a stage 18 mounted on springs 19, to accommodate envelopes, magazines, etc., of different thicknesses, and to provide counterpressure when the punch 14 applies the label. The label applying machine is shown as having its base 10 supported on a cabinet or stand 20 with a smooth upright end wall 21.

Figure 2:
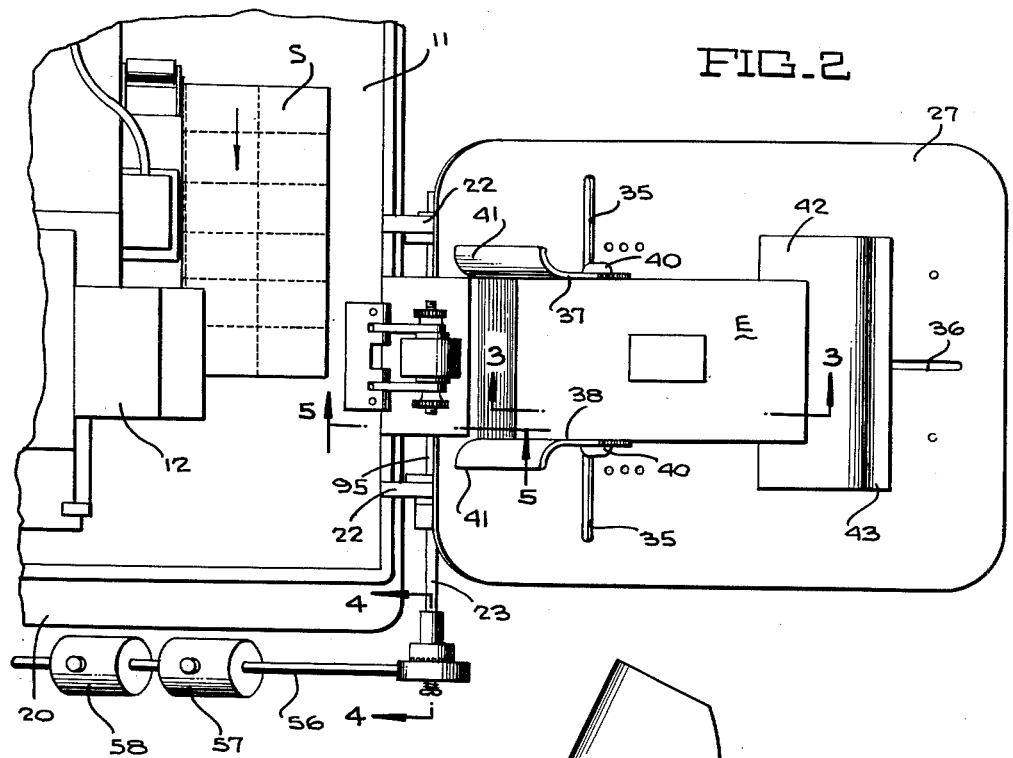
FIGURE 2 is a top view of the same.
Figure 3:
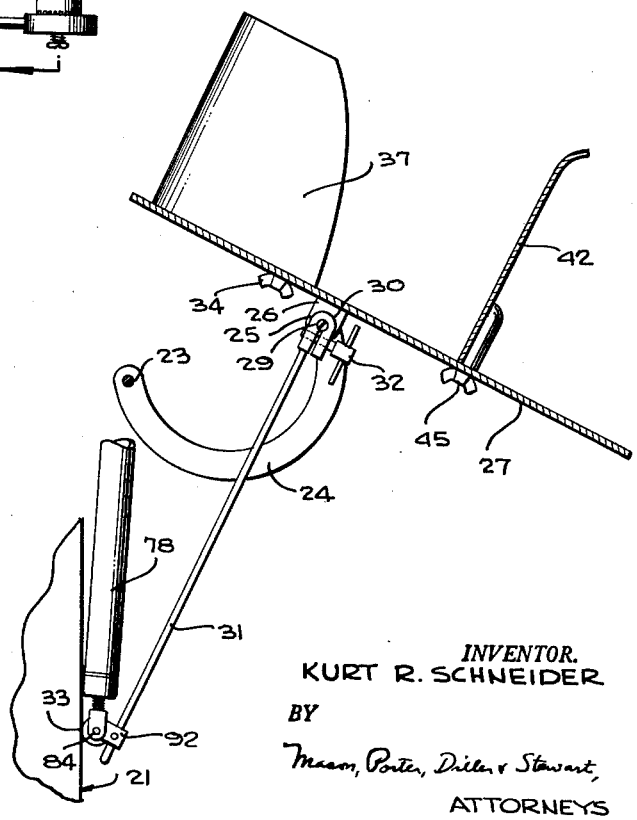
FIGURE 3 is an upright sectional view, substantially on line 3—3 of FIGURE 2, of a control device.

Brackets 22 are secured to the end wall 17 of the base 10 with a fixed spacing bar or rod 95 between them, and rotatably support a transverse horizontal rock shaft 23 which extends past (FIGURE 2) one end of the stand 20. Arms 24, illustratively of arcuate shape to permit the platform to descend over them and to or below the level of the shaft 23, are fixed to this shaft and at their outer ends engage a pivot rod 25 carried by and fixed to the depending lugs 26 secured to the bottom of the stack-receiving platform 27. The rod 25 can rotate relative to the arms 24. The transverse axis provided by the pivot rod 25 permits the platform to rock relative to the arms 24; and is located so that the weights of the platform and its parts when empty, and of the platform and parts with a full stack of articles thereon, have centers of gravity located to cause a clockwise rocking in FIGURE 1. A clamp head 30, FIGURE 3 embraces the rod 25 and can be fixed thereto: and has an extension rod 31 secured thereto. A screw 32 engages the clamp head for fixing it in a desired angular position on the rod 23 relative to the platform 27 so that the rod is immovable relative to the platform 27. At its lower end, the rod 31 has a yoke support 92 for the pivot 83 of a roller 33 so that this roller can move up and down along the end wall 21 of the cabinet as the platform rises and falls.

The platform 27 has, FIGURE 2, transverse slots 35 and a longitudinal slots 36, FIGURE 2. Side wings 37, 38 extend upward from the platform surface, and can be adjusted laterally toward and from one another along the slots 35, and be fixed against movement by screws 39, FIGURE 1, which pass through the slots and engage in the rounded outer projections 40 on the wings. The side wings have laterally and outwardly curved front edges 41, FIGURE 2, for guiding the articles. A rear wall 42 has a rearwardly curved upper edge 43, FIGURE 1, and a rear projection 44 above the slot 36 so that a screw 45 can pass through the slot 36 and into the projection for fixing the rear wall in position along the slot.

Figures 4, 5:
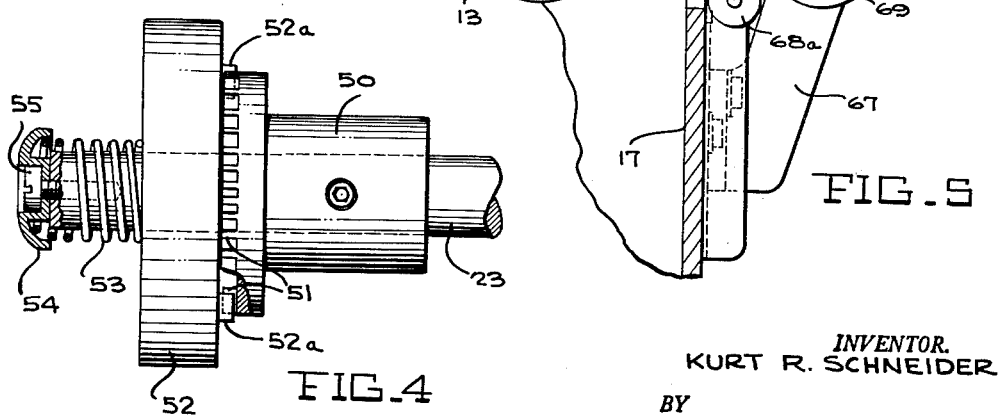
FIGURE 4 is a detail view, at a larger scale and substantially on line 4—4 of FIGURE 2.
FIGURE 5 is a detail view, at a larger scale and substantially on line 5—5 of FIGURE 2.

The rock shaft 23, FIGURE 4, has a sleeve 50 secured thereto, this sleeve having peripherally spaced dog clutch teeth 51 on its outer face. A disk 52 can be slid along the shaft 23, being normally urged toward the right in FIGURE 4 by a spring 53 which reacts against a collar 54 secured on the shaft 23 by a screw 55. The disk 52 has dog clutch teeth 52a for selective mating engagement with the teeth 51. A counterbalance rod 56 extends, FIGURE 1, from the disk 52 and carries counterbalancing means, illustrated as the two weights 57, 58 of which each has a clamping device 59 for fixing its position radially relative to the axis of shaft 23.

Such a clamping device may be made as in FIGURE 15, as a cylinder 59 which can slide in a part-depth hole 59a in the mass 58, being forced outward by a spring 59b. A large hole 59c through the plunger loosely receives the arm 56: and a smaller hole 59d merges therewith to provide sharp edges which engage and firmly hold to the arm 56 under the action of the spring 59b. The mass 58 itself is a close sliding fit on the rod 56.

A pivot support block 60, FIGURES 1, 5 and 6, is mounted on the top table 11 at a point free of the path of the label sheet S, and pivotally carries the links 61 which extend past the edge of the top plate and support the shaft 62 of an upper take-away roller 64. When water moistening is employed for attaching labels to envelopes, etc., this roller 64 has effect in pressing the label against the article: and it can be made with a surface of absorbent sponge material for taking up any liquid around the label, before the article is delivered into the stack. A harder-surfaced lower counter-roller 66 is mounted on brackets 67 which are adjustable up and down on the end plate 17 so that the position of the upper surface of the roller can be adjusted relative to the level of the lower surface of the top plate 11 for accommodating articles of differing thicknesses. This roller 66 can be driven by a belt 68 which passes over a pulley 69 on the shaft of the roller 66 and also passes over a pulley 70 on the shaft of a pair of the driven rollers 13 of the applying machine. By coordinating the sizes of rollers 13, 66, and their pulleys 70, 69, the peripheral speed of roller 66 may be made greater than that of the driven roller 13, so that when the article leaves the last rollers 13, it is accelerated in speed: so long as the article is engaged by the roller 13, this latter determines the speed, and the hard-surfaced roller 66 slips on the lower surface of the article.

The block 60, FIGURES 5 and 6, is preferably secured to the table top 11 by having the latter of magnetisable material and securing a permanently magnetic bar 71 in the bottom of the block, e.g., by staking. Two locating pins 72 are fixed in the block, for engagement (FIGURE 5) in holes of the table top 11, for fixing the block 60 in position relative to the path of the label sheet A, and for presenting the top roller 64 for engagement with the top of the issuing labelled envelope or the like. Preferably, the axis of the roller 64 is located farther from the table edge than the axis of the lower roller, as shown in FIGURE 5, so that a downwardly deflecting effort is exerted upon the envelope so that it is directed relatively downwardly into the stack receiver.

The shaft 62 of the upper roller preferably has reduced threaded ends, received in notches 61a in the tops of the links 61, FIGURE 6, so that knurled nuts 62a are effective to render the shaft solid with the links. The roller 64 illustratively has an internal brass sleeve 64a which turns freely on the shaft 62.

The brackets 67 can be formed integrally, FIGURE 7, with a connecting web 67a which has an upright slot 67b for receiving the binding screw 67c for fixing the height of the lower roller 66. The roller 66 is shown, FIGURES 7 and 8, as having three sections, with spaces therebetween for the brackets 67. The roller shaft 66a receives the roller sections, with spacer sleeves 66b therebetween: end members 66c of larger diameters than the holes in the rollers fit against the outer faces, and screws 66e bind the assembly together. The sleeves 66b turn in the brackets 67. One end member 69 has a peripheral groove for the belt 68. To control belt tension, a loose pulley 68a, FIGURES 5 and 7, may be provided on a bracket 68b which has an upright slot 68c for the binder screw 68d, so that the pulley 68a can be positioned relative to the belt for preventing belt loss when the stage 18 moves relative to the roller 66.

The structure as described above for FIGURES 1–8 operates; but often the upward return of the platform 27 is too rapid, after a load is removed therefrom. Accordingly, motion dampening means are preferably employed as shown in FIGURES 9–14, such means illustratively including both a cushioning cylinder and a mechanical brake, although either may be used alone in some employments.

In FIGURES 9 and 9A, the rock shaft 23 is embraced by the parts 75, 76 of a cylinder head structure which can rock relative to the shaft 23. The parts are held together by screws 77, and the lower part 76 is sealed to the upper end of a pneumatic cylinder 78, which has a plug 79 at its lower end for loosely guiding the piston rod 80, with a restricted space 81 between the piston rod and the plug for air admission and escape. The piston 82 is secured to the piston rod, for movement in the cylinder. The lower end of the piston rod 80 is threaded into a yoke 83 which is pivoted on the projecting ends of the pivot 84 for the guide roller 33. A short cushioning spring 85 can be provided around the rod 80, between the plug 79 and the yoke 83; and a spring 85a can be provided around the rod 80 within the cylinder for engagement by the piston as the latter approaches the plug 79. The parts 75, 76 have a passage 86 from the interior of the cylinder to a conical valve seat 87, with a branch passage 88 to the atmosphere. An extension of the passage 86 in part 75 has a threaded wall to receive the threaded stem of a needle valve 89 which has a conical lower end to control the flow between passages 86, 88. A spring 90 can fix the needle valve in adjusted position. A spring strap 91 is preferably fixed at one end to the upper structure 75, 76, as by the screw 77a engaged in the part 75, and extends upward to engage the cross-brace 95; for restricting outward swinging of the cylinder.

A second yoke 92 on the pivot 84 has an aperture in which the rod 31 is fixed, with the upper end of the rod 31 fixed in the end piece 26 which is held rigidly on the shaft 25 beneath the platform 27, by a clamp screw 32.

In FIGURES 10–14, a centrifugally controlled brake assembly is shown. The spacer rod 95, FIGURES 1, 9 and 10, between the brackets 22 is fixed thereto, e.g., by having reduced ends 96 which pass through holes in the brackets 22 for receiving clamping nuts 97. The clamping nut 97 shown in FIGURE 10 has a reduced axial extension 98 with a threaded end which projects through a housing 100 and receives a binding nut 101. The housing 100 has an annular flange 102 which is concentric with the rock shaft 23. The rock shaft 23 is supported in the brackets, as by antifriction bearings 103 and has a driving gear 104 fixed thereon. Gear 104 is in mesh with a driven gear 105 of a lesser number of teeth, which is connected as a first set with a larger gear 106, and is rotatable therewith around a stub shaft 107 screwed into the bracket 22. The gear 106 is in mesh with the smaller of the second set of connected gears 108, 109 which rotate together about the extension 98: the larger gear 109 being in mesh with the smaller gear of a third set 110, 111 which rotate together about the stub shaft 107. The larger gear 111 is in mesh with a gear 112 fixed to the rotor or flywheel body 113. Illustratively, the body 113 is supported on antifriction bearings 114 for free rotation relative to the rock shaft 23; the outer race of one bearing being detained by a ring 115 pressed into the end of the body and itself connected to the gear 112 so the parts move together. A collar 116 fixed on shaft 23 restricts axial movement of the body 113. A clamp nut 117 is threaded on the end of the stub 107 which projects through the housing 100 whereby the housing provides outboard support for the stubs and the gear sets thereon.

The body 113, FIGURE 12, has a peripheral groove 118 and a diametrical bore 119, this bore being divided by the shaft 23. As shown in FIGURES 10 and 13, arcuate brake blocks 120, externally contoured to fit the flange 102, are fitted in the groove 118; these blocks having chordal faces at the ends of their axes, these faces being convergent outwardly as shown by the lines 121, 122 in FIGURE 13, with an angle therebetween of about ten degrees. The radial dimension of the brake blocks is less than the radial spacing of the bottom of the groove 118 and the inner surface of the housing flange 102. Balls 123 are located in the parts of the bore 119; of a greater diameter than the axial thickness of the brake blocks, to maintain the blocks against major peripheral displacement relative to the body 113, and such that when the balls are adjacent the shaft 23, the brake blocks can be free of the flange 102, and when the balls are moved radially outward they press against the chordal surfaces of the brake blocks and force the same against the flange 102.

In the modified form shown in FIGURE 14, the brake blocks 125, 126 act inwardly upon the shaft 23, and the outer housing 102 may be dispensed with. The brake blocks 125, 126 are shown as pivoting about axes 127 parallel and eccentric to the axis of shaft 23, and are mounted in peripheral notches of the body 113. The blocks form crank levers, with the longer arm 128 of each having a surface 129 for engagement by a ball 123 which moves outward radially with respect to the axis of shaft 123 by centrifugal force as the body 113 spins: the balls being guided by the walls 119 of the body notches as in FIGURE 12, and by the parts 128 of the body 113. The shorter arm of each brake block has a surface 130 which is free of or bears lightly upon the shaft 23 while the latter is at a standstill or is moving slowly. As the speed of the body 113 increases, the blocks and the balls 123 move outward by centrifugal force, and press the longer arms 128 so that the brake blocks rock on their pivots 127 and parts of their surfaces 130 are pressed against the shaft 23 with a braking force determined by the angularity of surfaces 129 relative to the radial travel of the balls and the lever advantage of the blocks as respects surfaces 129, 130, and by the centrifugal force then being exerted. When the body 113 slows down again, the reduction of centrifugal force and the effect of gravity is for the balls to move inward and the braking action is reduced or eliminated.

It will be noted, in both forms, that balanced braking forces are involved. In FIGURE 13, the brake blocks 120 are symmetrical so that the braking forces generated by the balls 123 are equal and opposite along various diameters of shaft 23 and housing 120. In FIGURE 14, the symmetry of the blocks 125, 126 effects equal pressures upon the shaft 23.

For operation, and assuming the article treating machine applies labels to envelopes, the position of roller 66 is first adjusted so that it engages the lower surface of each envelope as the envelope emerges from the end wall 17. The screw 32 can be loosened, and the platform 27 adjusted to an angle of rearward and downward inclination, FIGURE 1, at which the envelopes can slide on one another with braking effect, until they are stopped without significant rebound in a position of contact with the end wall 42; care being taken that the roller 33 is bearing against the wall 21: and the screw 32 is tightened to maintain this angle. The side wing screws 39 are released, and the side wings adjusted into position to receive the envelopes as they successively emerge through the end plate 17: and the screws 39 tightened. The rear plate 42 is similarly adjusted to a position where the proposed stack of envelopes will be free of the front edge of the platform 27 and with the centers of gravity to the left of the axis of pivots 25. In its empty position, the platform 27 has been raised by the counterbalance until its forward edge is slightly below the top level of the roller 66: a weight equal to the weight of a full stack of envelopes can then be placed upon the platform, or an equivalent downward pressure exerted thereon, to depress the platform; and the effect of the counterbalance weights and the regular position of the counterbalance are determined by observing the level of the tops of the wings 38, noting that a full stack will come to approximately this level. If the platform level is too high, one or both weights 57, 58 can be moved toward the shaft 23; and, if the platform is too low, moved away therefrom. The weight or pressure is then removed, and the platform resumes its upper position.

The article treating machine is now started; and a succession of articles are delivered from the last pair of driven rollers 13, passing over the roller 66 and being held thereagainst by the gravitationally acting upper roller 64; so that the first article is accelerated and projected over and onto the surface of the platform 27 and slides along it into contact with the rear wall 42, and succeeding articles are likewise each projected onto the preceding article which has entered the stack P, FIGURE 1. The increasing weight of the stack P causes the platform to move downward, with the arms 24 turning the rock shaft 23, but with the platform held in the same angular position relative to the floor and the cabinet top, by the action of rod 31 and roller 33. This weight is counterbalanced by the increasing effect of the weights 57, 58 as they move away from the upright plane through the axis of the shaft 23, with increase of effective lever arm ratio.

If it is found that the distance of descent is too great during the collecting of the first half of a full stack, this can be compensated by varying the angular relation of the rod 56 to the arms 24, so that the weights are relatively farther from the upright plane through the axis of shaft 23 at this stage. This is accomplished by supporting the platform 27 momentarily, pulling the disk 52 outward or to the left in FIGURE 4, lifting the rod 56 so that the disk 52 is rotated relative to the sleeve 50, and then releasing the disk 52 so that the spring 53 causes the dog tooth clutch to engage in a new position. In general, it is found that when a proper position has been found for the disk 52 relative to the sleeve 50 for a given size and weight of article, essentially no further change is needed for other sizes and weights and that compensation and counterbalancing can then be effected by shifting the weights 57, 58.

When the stack has reached a desired height, it can be lifted out, and a new stack started: noting that the spacing of the rear wall 42 from the rear edges of the side wings can permit engagement with the stack at the front edge and the rear corners.

This rate of movement of the platform 27 is controlled by the dampening devices, when present. Thus, assuming that a load has been removed from the platform at its lowest position, so that it is free to be lifted by the weights 57, 58, wherewith the piston 82, FIGURE 9, is near the bottom of the cylinder 78, with the piston rod projecting downwardly to the pivot 84 of the roller 33, and the rod 31 effective to control the platform angle relative to the floor. Upon rocking of the shaft 23 and its arms 24, the platform 27 is lifted as before, and draws rod 31 with it, thus raising the roller 33 along the guide wall 21 and raising the piston 82 in the cylinder 78. The air in the cylinder 78, above the piston is compressed, but finds a restricted escape through passages 86, 88, past the adjusted needle valve 89. Since the effect of the weights 57, 58 varies as a trigonometric function of the prevailing position of the weight arm 56 and of the platform arms 24, the force exerted upon piston 82 gradually decreases, and therewith the pressure in the piston can drop. As equilibrium is reached, the air pressure in the cylinder can still exert a restricting effect, for a setting of the needle valve at small aperture, wherewith the platform can come to rest at the equilibrium position, essentially without oscillation back and forth past such position.

The rocking of shaft 23, due to the over-balancing effect of weights 57, 58 relative to the unloaded platform, also causes the speed-increasing gears 104, 105, 106, 108, 109, 110, 111, 112 to be driven, so that the body 113 is rotated about the shaft 23 at a speed many times greater than the angular motion of the shaft. Therewith, the balls 123 are carried about the shaft 23 and are caused by the centrifugal forces thereon, to press against the ends of the brake blocks and force these radially outward relative to the body 113 until they engage against the inner surface of the fixed flange 102 with a force proportioned to the speed of rotation and thus to the rate of angular movement of the shaft 23, and the rate of ascent of the platform 27. Therewith, although the body 113 can act as a momentum mass to prevent change of rate of platform movement, e.g., as it slows due to the aforesaid trigonometric effect during the latter part of the travel, the braking action reduces the tendency, and as the platform approaches its position of equilibrium, the rate of rotation of the body 113 is slowed therewith, and ultimately the centrifugal forces on the balls 123 are no longer able to hold them outward against gravity, for example, so that a ball moving upward with the body 113 tends to move inward toward the axis of shaft 23, thus reducing the braking effect.

Conjointly or together, the dampening devices act to prevent excess upward movement of the platform 27, and its over-shooting the position of equilibrium, with subsequent decremented oscillation. The illustrated pneumatic cylinder and piston arrangement has a like effect upon downward movement of the platform: that is, downward pressure thereon meets resistance, due to controlled escape of air through the bottom aperture 81, and the vacuum lift effect at the top of the piston. The illustrated centrifugal brake can act during both upward and downward movements: but its maximum retarding effect is determined by a correspondingly high rate of upward or downward movement of the platform.

Illustrative operations may have the peripheral speed of the feed rollers 13 at 141 feet per minute, and of the roller 66 at 210 feet per minute, with a throughput of over 200 standard postcards per minute. The center portion of the bottom roller 66 is preferably narrower than the label width, with the top roller 64 extending across the label, with both aligned with the label position as it is delivered through the table top 11 onto the envelope. When the platform 27 is to receive postcards, the platform may have an angle of about 5 degrees to the horizontal, with the edge adjacent the labeling machine higher than the outboard edge: the weight arm 56 is positioned to be horizontal or above horizontal when the platform is loaded, this adjustment being effected when the platform is down, by pulling out the disk 52 until its teeth 52a are disengaged, shifting the angle of arm 56, and releasing the disk 52 so that its teeth are re-engaged by the action of the spring 53. For heavier articles, e.g., filled envelopes and magazines, the arm 56 preferably is relatively lower when the platform is raised, compared to its position with a raised platform when postcards are being received and stacked.

It is obvious that the invention is not restricted to the illustrative showing, but may be employed in many ways within the scope of the appended claims.

What is claimed is:

1. A stacking apparatus for receiving and stacking flat articles delivered successively thereto and removable as a group therefrom, comprising a support, a rock shaft journaled on the support, a first arm fixed to the rock shaft, a stack-receiving platform pivotally mounted on the arm, a counterweight arm fixed to the rock shaft, the said arms extending in opposite horizontal directions from the axis of the rock shaft, and means having a part connected to the platform at a fixed angle relative thereto said slidable along the support for controlling the position thereof during movement of the first arm.

2. An apparatus as in claim 1, in which adjustable stack-guiding members are carried by and extend upward from the platform for fixing the position of the center of gravity of the stack relative to the pivot mounting of the platform on the first arm for establishing the force effective to maintain said part in contact with the support.

3. An apparatus as in claim 1, in which the said controlling means includes an upright surface on said support, a roller for travelling up and down on the surface, and a member fixed to the platform and carrying the pivot for said roller.

4. An apparatus as in claim 3, in which the mounting of the platform comprises a pivot fixed to the platform and journaled in the first arm, and the member is seated on said pivot and has clamping means for fixing it to the pivot whereby to control the angular position of the platform relative to the horizontal.

5. An apparatus as in claim 1, in which a pair of first arms are provided, a pivot shaft journaled to move in said first arms with the pivot shaft axis parallel to the rock shaft axis, the platform having a downwardly extending portion fixed to said pivot shaft, a clamp member on the pivot shaft and means for adjustably clamping said member to the pivot shaft, an extension from the clamp member, and a roller carried by said extension, the support having an upright surface upon which the roller can travel up and down.

6. An apparatus as in claim 1, including braking means for restricting the rate of upward and downward movement of the platform.

7. An apparatus as in claim 6, in which the means comprises a cylinder and a piston movable in the cylinder, the piston being connected to the platform and the cylinder connected to the support, and means for controlling the flow of fluid into and from the cylinder.

8. An apparatus as in claim 1, in which the support has an upright surface, and said controlling means includes an extension having a roller movable up and down along said surface, a cylinder element and a piston element movable therein, one element being connected to the support and the other element connected to the extension adjacent the roller mounting thereon, and means for restricting fluid flow into and out of the cylinder.

9. An apparatus as in claim 8, in which the said elements are pivotally connected to the support and to the extension, and in which the element connected to the support has a stop for engaging a part of the support and thereby limiting movement of the said roller away from the said surface.

10. An apparatus as in claim 8, in which the piston is connected to the extension, and the upper end of the cylinder is pivotally supported on the rock shaft, and comprising a spring stop piece connected to the upper end of the cylinder and extending for engagement with a part of the support and thereby limiting movement of the said roller away from the said surface.

11. An apparatus as in claim 6, in which a body is mounted on the rock shaft for rotation about the same, a speed-multiplying gear train connects the rock shaft and the body, a centrifugal device carried by the body, and brake means actuated by the centrifugal device for retarding the rate of rotation of the body about the rock shaft.

12. An apparatus as in claim 11, in which the body has a peripheral groove and a radial bore, and the brake means includes a brake block in the peripheral groove, and the centrifugal device is a mass movable in the radial bore by centrifugal force and cooperative with the brake block for actuating the same.

13. An apparatus as in claim 12, in which the support includes a housing with an inner surface concentric with the rock shaft, and in which the brake block is actuated by the mass to be moved into engagement with the housing.

14. An apparatus as in claim 13, in which a pair of symmetrical brake blocks are provided in symmetrical positioning in the peripheral groove, each block having its ends directed at an angle to the axis of the radial bore, said bore being of greater diameter than the width of the peripheral groove, and a pair of balls provide centrifugal masses in said bore and cooperate with the said end surfaces of the brake blocks to force the same apart and into contact with said housing surface and are effective to prevent peripheral movement of the brake blocks relative to the body.

15. An apparatus as in claim 11, in which the brake means includes a brake block pivoted on the body and having a long arm and a short arm, in which the centrifugal device acts against the long arm, and the short arm has a brake surface to be brought into contact with the rock shaft when the long arm is actuated by the centrifugal device.

16. An apparatus as in claim 15, in which the body has a radial bore, a pair of essentially identical brake blocks are pivoted on the body at symmetrical diametrically opposite axes, said brake blocks each having a long arm and a short arm, and the centrifugal device is a pair of balls movable away from one another in the radial bore, and cooperative with the said long arms for rocking the blocks outward by centrifugal force whereby to press the short arms into braking engagement with the rock shaft.

17. An apparatus as in claim 1, in which a radial projection is provided on the rock shaft, in which the counterweight arm is rotatable about the rock shaft axis relative to the first arm, and in which a device is present on the counterweight arm cooperative with the projection for selectively fixing the angular relationship thereof with respect to the first arm about the axis of the rock shaft.

18. An apparatus as in claim 17, in which the rock shaft has axially projecting clutch teeth means and the counterweight arm includes a sleeve rotatable about and axially movable along the rock shaft and includes clutch teeth means cooperative with the clutch teeth means on the rock shaft whereby the angular position of the counterweight arm can be adjusted relative to the position of said first arm.

19. An apparatus as in claim 18, in which a radially projecting member is provided on the rock shaft, and a coil spring surrounds the rock shaft and engages said projecting member and said sleeve for forcing the sleeve clutch means into engagement with the rock shaft clutch means.

20. An apparatus as in claim 1, in which a radial projection is provided on the rock shaft, the counterweight arm includes a rod mounted on the rock shaft for rotation relative thereto, means for fixing the rod to the projection at a selected angular relationship to the first arm, a mass movable along the rod for controlling the torque exerted by the counterweight arm upon the rock shaft, and means for fixing the mass at a selected position on the rod.

21. An apparatus as in claim 20, in which the fixing means includes a plunger movable radially relative to the rod axis, the mass having an axial bore for receiving the rod and a radial bore for receiving the plunger, and a spring in the radial bore for forcing the plunger relatively outward, said plunger having an aperture for loosely receiving the rod and a tooth for engaging the rod upon such outward movement, the plunger having its outer end accessible for effecting inward movement of the plunger.

22. An apparatus as in claim 1, in which the mechanism for delivering the flat articels includes a spring pressed delivery roller which is moved downwardly as the article passes thereover, comprising a bracket, a lower driven roller mounted on the bracket, means for holding the bracket to the support at a selected position of vertical adjustment of the upper part of the said lower roller relative to the lower surface of the article as the latter passes from said delivery roller, and an upper roller for pressing the article against the lower roller.

23. An apparatus as in claim 1, in which the mechanism for delivering the flat articles to the apparatus includes a driven shaft located adjacent the apparatus and having a delivery roller thereon, comprising a receiving roller mounted on the support and over which the articles are delivered, and a coaxial pulley secured thereto, a pulley on the said driven shaft, a belt connecting said pulleys, another pulley engaged with the belt, and a holder for said pulley adjustable vertically on said support.

24. An apparatus as in claim 23, in which the pulley ratio is such that the peripheral speed of the receiving roller is greater than the peripheral speed of the delivery roller.

25. An apparatus as in claim 1, in which the mechanism for delivering the flat articles to the apparatus has a flat upper surface above the level of article delivery, a driven receiving roller journaled on the support and over which the articles are delivered, a base member having downwardly projecting locating extensions, said base member being adapted to rest on said surface and its extensions to be located by cavities in the said surface, arms rockable on said base member, and an upper roller supported by said arms.

26. An apparatus as in claim 25, in which said upper surface is on a magnetisable material, and the base member has a permanent magnet secured thereto for removably holding the base member on said surface.

27. An apparatus as in claim 1, in which the mechanism for delivering the flat articles to the apparatus has an upper roller supported thereon for bearing downward against the top surface of the successive articles, a bracket adjustable in vertical position and carried by the support, and a driven lower receiving roller journaled on the bracket for delivery of the articles thereover, the axis of the lower receiving roller being upstreamward of the axis of the upper roller, relative to the direction of article travel whereby a relatively forward and downward direction of movement is imparted to the article as it leaves the said upper and lower rollers.

28. A stacking apparatus for a mechanism for applying labels to the upper surfaces of envelopes and like flat articles and including wetting means whereby the envelope area around the label may be wetted, comprising a platform for receiving the articles and establishing a stack thereof, rocker means for supporting the platform, a counterweight connected to the rocker means, a driven lower roller for receiving the article from the label applying mechanism and forwarding the same onto the platform, and an upper roller for engaging the upper surface of the passing article to be driven thereby and effective and pressing the article against the lower roller, the lower roller being located upstreamward of the upper roller relative to the direction of article travel whereby a relatively forward and downward direction of movement is imparted to the article as it leaves the said upper and lower rollers, the upper roller having its surface of absorbent material for drying the wetted area of the article before it enters the stack.

References Cited in the file of this patent
UNITED STATES PATENTS

| | | |
|---|---|---|
| 705,998 | Hobbs | July 29, 1902 |
| 818,924 | Strong | Apr. 24, 1906 |
| 1,548,310 | Hartmann et al. | Aug. 4, 1925 |
| 2,083,948 | Gesell | June 15, 1937 |
| 2,699,331 | McGarvey et al. | Jan. 11, 1955 |
| 2,796,260 | Willard | June 18, 1957 |